March 30, 1948. C. D. DAVIDSON 2,438,545
GEARED MOTOR LINEARLY ACTUATED
Filed June 16, 1944 2 Sheets-Sheet 1
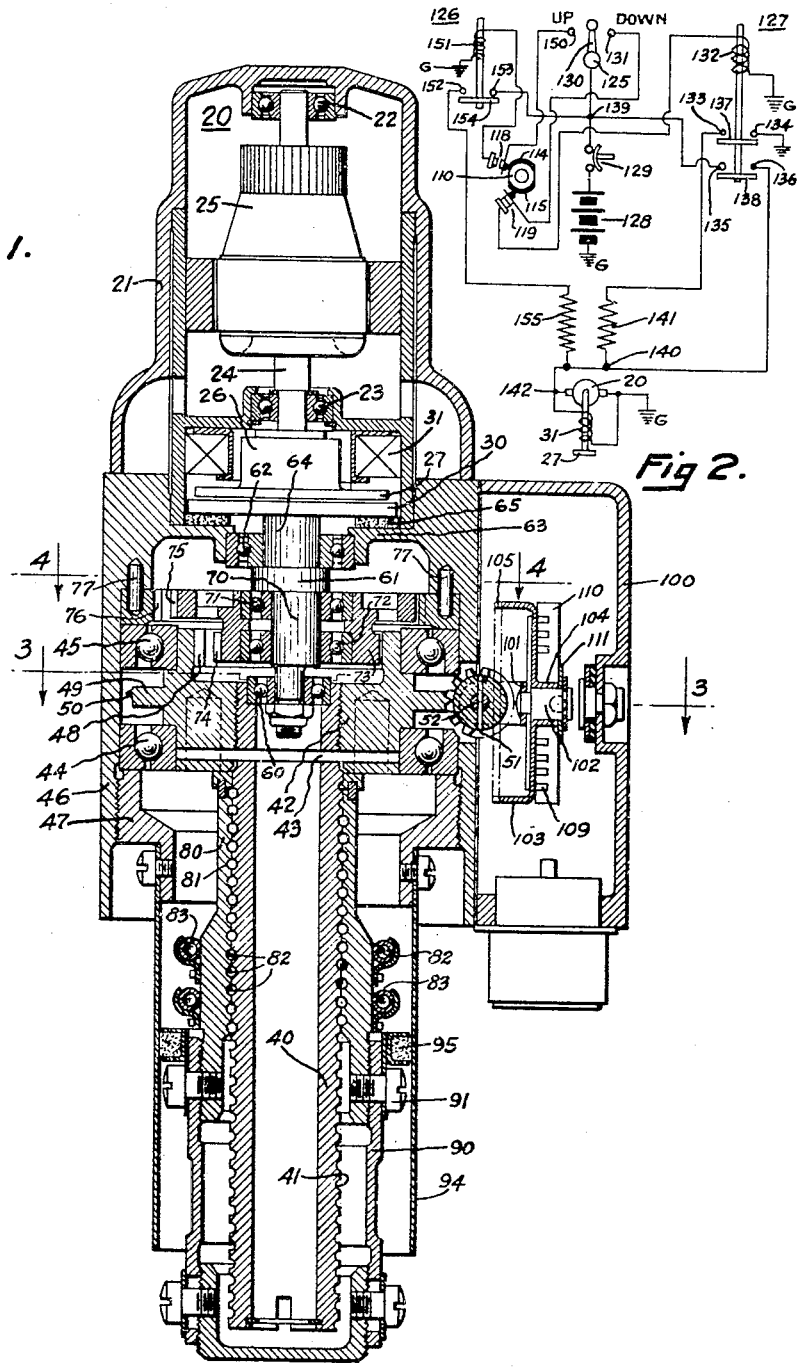
INVENTOR
CHARLES D. DAVIDSON
BY
HIS ATTORNEYS March 30, 1948.    C. D. DAVIDSON    2,438,545
GEARED MOTOR LINEARLY ACTUATED
Filed June 16, 1944    2 Sheets-Sheet 2

INVENTOR
CHARLES D. DAVIDSON
BY
HIS    ATTORNEYS

Patented Mar. 30, 1948

2,438,545

UNITED STATES PATENT OFFICE 2,438,545

GEARED MOTOR LINEARLY ACTUATED

Charles D. Davidson, Dayton, Ohio, assignor to General Motors Corporation, Detroit, Mich., a corporation of Delaware Application June 16, 1944, Serial No. 540,687

5 Claims. (Cl. 318—466)

This invention relates to an improved actuator, operated by a reversible electric motor, for raising and lowering a load.

It is among the objects of the present invention to provide a motor driven, load raising and lowering actuator with a control mechanism adapted automatically to stop motor operation when the load has reached a predetermined raised or lowered position.

This object is accomplished by providing an actuator comprising a screw shaft having a traveling, load supporting nut, the screw shaft being rotated in either direction by an electric motor. Limit switches are provided which, when actuated, will stop motor operation. A control device is driven through a lost motion connection with the screw shaft whereby one limit switch or the other is actuated to stop the motor when a predetermined number of revolutions of the screw shaft has caused the load supporting nut thereon to be moved into a predetermined position adjacent one end or the other of said screw shaft. When one limit switch has been opened to stop the motor from rotating the screw shaft in one direction, the other limit switch is closed preparatory to establishing motor operation to rotate the screw shaft in the opposite direction.

Further objects and advantages of the present invention will be apparent from the following description, reference being had to the accompanying drawings wherein a preferred embodiment of the invention is clearly shown.

In the drawings:

Fig. 1 is a longitudinal, sectional view of the actuator.

Fig. 2 is a diagrammatic view showing the various electrical devices of the system and their electrical connections.

Figure 3:
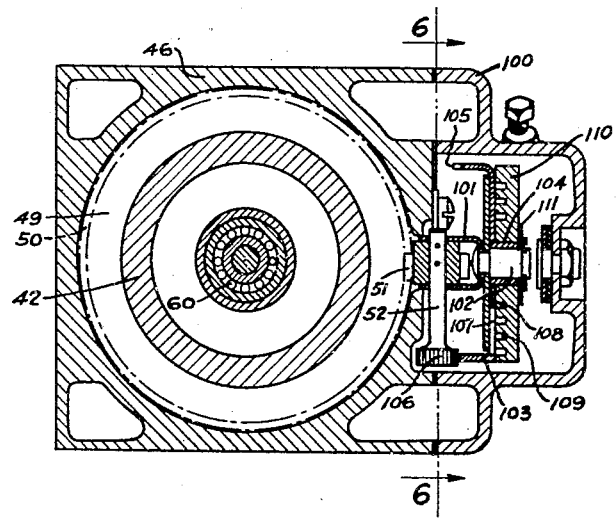
Fig. 3 is a sectional view taken along the line 3—3 of Fig. 1.
Figure 4:
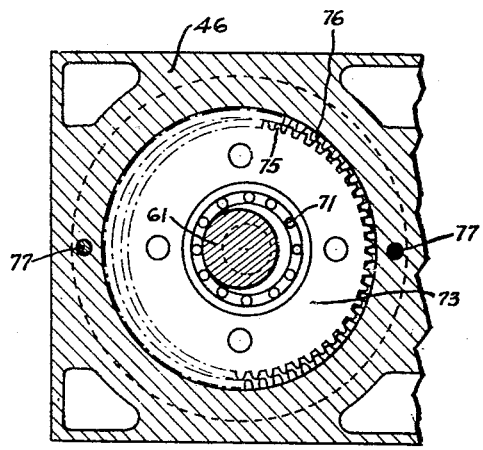
Fig. 4 is a part sectional view taken along the line 4—4 of Fig. 1.

Referring to the drawings and particularly to Fig. 1, the numeral 20 designates the electric motor comprising a housing or frame 21 supporting two aligned ball bearings 22 and 23 in which the shaft 24 of the motor armature 25 is journalled. The end of the armature shaft 24 extending beyond the bearing 23 has the driving cup 26 secured thereto so as to be rotated thereby, the cup 26 having an outwardly extending flange 27 which is spaced from and parallel to the movable armature disc 30 of the electromagnetic clutch which includes also the magnet winding 31 supported within the housing 21 and surrounding the driving cup 26.

The electric motor 20 is the prime mover for the screw shaft 40, which is an elongated tube having a spiral groove 41 formed in its outer peripheral wall surface, the one end of the shaft being threadedly received by a central opening in the gear 42 to which said screw shaft is also securely fastened by the pin 43.

The gear 42 is rotatably supported by two roller bearings 44 and 45 secured in the gear housing 46 upon which the motor housing 21 is carried. A clamping ring 47, threadedly received in the end of the housing 46, holds the bearings 44 and 45 and the gear 42 supported therebetween, in said housing 46. The end of the gear 42, supported in bearing 45, is recessed to provide an interior gear comprising gear teeth 48. Gear 42 also has an outwardly extending, annular flange 49 upon the circumferential surface of which is provided a worm gear tooth 50 of substantially one and one-half to two convolutions. This worm gear 50 operatively meshes with a pinion 51 secured to a shaft 52 supported by housing 46 in a manner substantially tangential to the gear 42, see Fig. 3.

The end of the screw shaft 40, in gear 42, is recessed to receive a ball bearing 60 in which one end of the stub shaft 61 is journalled, the other end of said shaft being journalled in the ball bearing 62 supported in a central recess provided in the partition wall 63 in housing 46. The hub portion 64 of the electromagnet clutch armature disc 30 is slidably secured to the adjacent end of the stub shaft 61 in any suitable manner which permits relative endwise movement between the disc 30 and the stub shaft 61 but no relative rotational movement therebetween. Any suitable means is also provided which normally urges the disc 30 into gripping engagement with the brake or friction ring 65 secured to the partition wall 63 of housing 46. A preferred form of construction slidably mounting the disc 30 upon the stub shaft and including a spring for urging the disc into engagement with the friction ring is clearly illustrated and described in the copending application of Calvin J. Werner, Serial No. 468,475, filed December 10, 1942, now Patent No. 2,383,901, dated August 28, 1945.

The stub shaft 61 has an intermediate portion 70 which is eccentric to the portion of the shaft journalled in the ball bearings 60 and 62. Two ball bearings 71 and 72 are supported on the eccentric portion 70 of the stub shaft and in turn support the single member 73 which provides the epicycloidal gear portions 74 and 75. The gear 74 is in constant mesh with the internal gear teeth 48 of gear 42 while the gear 75 is in constant mesh with the internal annular gear ring 76 anchored in the housing 46 by key pins 77.

The screw shaft 40 carries a travelling nut 80, the interior of which has a spiral slot 81 corresponding in size and pitch to the spiral slot 41 in the exterior surface of the screw shaft 40. The two coinciding spiral slots, 41 of the screw shaft and 81 of the nut, form a spiral channel in which a plurality of balls 82 travel, these balls mechanically connecting the nut with the screw shaft. Return ducts 83 are carried on the outside of the nut 80. The method of connecting a nut with a screw shaft is detailedly illustrated and described in the aforementioned application of Calvin J. Werner, Serial No. 468,475, filed December 10, 1942, now Patent No. 2,383,901, dated August 28, 1945.

An extension sleeve 90 is threaded to the outer end of nut 80 and anchored thereto by screws 91. The lower or outer end of sleeve 90 is adapted to have the load secured thereto so that it may be raised or lowered as the rotation of the screw shaft caused the nut to move toward or away from the end of the said screw shaft anchored to the gear 42. A dust cover tube 94 is secured to the screw clamp ring 47. The sleeve 90 carries a slip sealing ring 95 which slidably engages the inner surface of the tube 94 and seals the interior of the mechanism against dust and dirt.

Figs. 1, 3, 5 and 6 clearly illustrate the limit switch mechanism for controlling the operation of the motor.

As mentioned in an aforegoing paragraph, the gear 42 has a flange 49 on the peripheral surface of which there is provided a 1½ to 2-convolution gear tooth forming a low pitch worm engaging with the pinion 51 secured to the shaft 52. This shaft is journalled in a bearing provided between the housing 46 and a subsidiary housing 100 secured to housing 46. This subsidiary housing contains the limit switch mechanism which controls or limits the operation of the motor in either direction.

The limit switch mechanism comprises a stationary bracket 101 in which the shaft 52 is rotatably supported, said bracket being carried by the housing 46. A stub shaft 102 is secured to bracket 101. A cup-shaped member or driver 103 has a hub portion 104 rotatably supported by said stub shaft. This driver has gear teeth 105 formed in the edge of its peripheral wall portion which mesh with the pinion 106 secured to or formed integral with the shaft 52. A radial slot 107 is provided in the flat wall surface of the driver 103, said slot receiving a tongue of the key 108 which extends into the helical slot 109 formed in the adjacent surface of the driven cam 110 which is rotatably mounted on the hub portion 104 of the driver 103 and secured thereon by the washer 111. The helical slot 109 in the driven cam 110 has an outer end 112 and an inner end 113. The cam 110 has two lobes 114 and 115 adapted to engage the actuating plungers 116 and 117 of limit switches 118 and 119 respectively. When said plungers 116 or 117 are engaged by the cam lobes 114 and 115 respectively, the switches 118 and 119 are operated to close their respective circuits and when the lobes do not engage the plungers the switches open their respective circuits. Each switch 118 and 119 is carried by a screw 122 and 123 respectively, said screws being threadedly supported by the subsidiary housing 100 so as to hold their respective switches in proper position relatively to the cam 110. Operation of the screws adjusts the switches tangentially relatively to the cam and thus changes the time at which the switch plungers are engaged and released by the lobes 114 and 115 of the rotating cam.

In the installation of this device certain electrical control elements are used as illustrated by Fig. 2. A selector switch 125 is provided, two contactors 126 and 127 and a storage battery 128 may be connected to the selector switch by a master control switch 129. All of the drawings show the device in the "up" position, that is, the nut 80 is at the top of the screw shaft 40 indicating that the load, supported by the extension sleeve 90 of the nut (load not shown) is in the lifted position.

When it is desired to lower the load, the operator actuates the movable contact 130 of the selector switch so that it engages the terminal 131, thereby closing the following circuit: from the battery 128 across the previously closed master switch 129, contact 130, terminal 131 across the engaging contacts of limit switch 119 through the magnet winding 132 of the electromagnetic contactor 127 back to the battery 128 via the ground connections. Energization of the winding 132 operates the movable contact of the contactor 127 so that the stationary terminals 133—134 and 135—136 are bridged by contacts 137 and 138 respectively, completing the following circuits: from the battery 128 across switch 129 to the junction point 139, thence across terminals 135—136 via the contact 138, through the electric motor 20 back to the battery through ground. A second circuit flows from the junction point 140 through the shunt field winding 141 of the motor 20 thence across the terminals 133—134 by way of the movable bridging contact 137 back to the battery through ground. A third circuit flows from the junction point 142 through the winding 31 of the electromagnet clutch to ground, energizing the driving cup 26 to attract and move the armature disc 30 from engagement with the brake ring 65 into operative engagement with the flange 27 of the driving cup 26 which is now being rotated by the electric motor 20 due to the energization of its field and armature circuits.

As the armature disc 30 is slidably keyed to the stub shaft 61 it too will be rotated causing the axis of its eccentric portion 70 to revolve about the axis of the annular gears 76 and 42 which are concentric to the armature shaft 24 and the screw shaft 40. The epicyclic gears 74 and 75 secured together as a unit are carried by this eccentric portion 70 of the stub shaft 61 and are therefore moved in its orbit so that gear 75 meshing with the stationary internal gear 76, will be rotated at a speed considerably below the speed of the armature shaft 24. The epicyclic gear 74, companion gear to gear 75 will, in rotating, rotate the annular gear 42, the internal teeth 48 of which are engaged by the gear 74. Gear 42 being attached to the screw shaft 40 will, in rotating, cause the shaft to rotate and when the electrical circuits as just described are established the rotation of the shaft 40 is such that the nut 80, held against rotation, will move downwardly to lower the load carried thereby.

Figure 5:
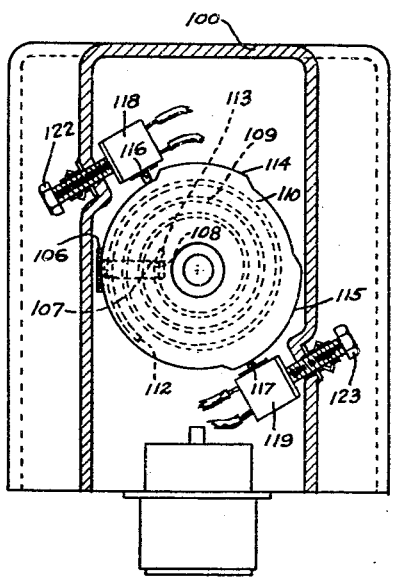
Fig. 5 is a view illustrating the limit switches and their actuating devices.
Figure 6:
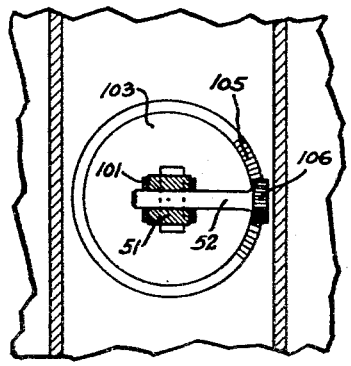
Fig. 6 is a view taken along the line 6—6 of Fig. 3.

As the gear 42 is rotated, the low pitch teeth 50 thereof, meshing with the pinion 51, will cause said pinion to be rotated slowly and consequently the pinion 106 on shaft 52 which is secured to pinion 51. As pinion 106 engages the teeth 105 on the driver 103, it in turn will be rotated by pinion 106. Rotation of the driver 103 will cause the key 108, a tongue of which extends into the radial slot 107 in the driver, to be moved in a counter-clockwise circular path. The main body portion of the key 108 extends into the helical slot 109 of the cam 110, at this time engaging the inner end 113 thereof, and as the key follows the helical slot 109 it will also move outwardly in the radial slot 107 in the driver 103. The helical slot 109 in cam 110 as illustrated by Fig. 5 requires better than three complete revolutions of the driver 103 to move the key 108 from one, in this instance the inner end of the helical slot, to the other or outer end at which movement of the cam results. Due to the gearing connection between the cam driver 103 and the gear 42 on the screw shaft, the latter must be rotated sufficiently to cause the nut 80 to move from one extreme position on the screw shaft into its other extreme position at the opposite end of said screw shaft before the cam 110 is operated to actuate one of the limit switches 118 or 119.

When the rotation of the screw shaft 40 by the electric motor 20 has caused the nut 80 to reach its lowermost position, the key 108 of the driver 103 will have reached the outer end 112 of the helical groove 109 in the cam 110 and rotating said cam counter-clockwise so that its lobe 114 acts to close switch 118 and lobe 115 to permit switch 119 to open. Now the circuit through the magnet winding 132 is broken and thus the contactor 127 is deenergized, causing it to open the bridge between terminals 133—134 and 135—136. This breaks the aforedescribed motor circuits and causes the motor to cease operation even though the selector switch is kept in contact with its stationary "down" terminal 131.

To lift the load carried by the nut 80 the operator moves the selector switch contact 130 to engage the "up" terminal 150, thereby connecting the battery 128 through switches 129 and 125 with the now closed switch 118 so that current will flow through and energize the magnet winding 151 of the contactor 126. This moves the bridging contact 154 to connect stationary terminals 152—153 thereby connecting the battery 128 with the series field winding 155 of the electric motor. Current flows from the juncture 139 across the terminals 153—152 via the bridge 154 thence through the series field 153 to juncture 142 where a portion of the current flow passes through the armature windings of the motor 20 and another portion through the magnet winding 31 to energize the electromagnetic clutch which connects the motor driven cup 26 with the armature disc 30 connected to the speed reducing gearing driving the screw shaft 40.

As before, rotation of the gear 42 of the speed reducing gearing causes rotation of the cam driver 103, in the opposite direction, however, in this instance for the motor 20 is now rotating in a direction opposite to that when the field 141 is energized for "down" movement. Now the key 108 is moved clockwise in the helical slot 109 of cam 110 so that the key moves from the outer end 112 of the slot toward its inner end 113. When the key engages this inner end the nut 80 will have reached its extreme upper position on the screw shaft and the cam 110 will have been moved so that its lobe 114 has permitted switch 118 to open its circuit and lobe 115 to operate switch 117 to close its circuit. Opening of switch 118 breaks the motor circuit and stops motor operation which has been rotating the screw shaft 40 to cause the nut 80 to move upwardly on said screw shaft and thus lift the load. This stopping of motor operation takes place even though the selector switch contact 130 is left in engagement with terminal 150.

If at any time it is found that the operation of the limit switches is not properly synchronized with the arrival of the nut 80 at either its lowermost or uppermost position, screws 122 or 123 may be operated to alter the position of the switches 118 or 119 respectively relatively to the cam lobes which operate them so that proper timing of the switch operations may be obtained.

From the aforegoing it may be seen that applicant has provided a motor driven load raising and lowering actuator with a control mechanism which automatically stops motor operation when the load supporting nut has reached a predetermined raised or lowered position.

While the embodiment of the present invention as herein disclosed constitutes a preferred form, it is to be understood that other forms may be adopted, all coming within the scope of the claims which follow.

What is claimed is as follows:

1. In a device of the character described, the combination with a screw shaft provided with a nut; an electric motor for driving said screw shaft; switches for controlling the motor and effecting its operation in one direction or the other; and an actuator for certain of the switches, operated by a member secured to and rotating with the screw shaft and comprising a driver and a driven cam, the cam having an elongated slot for receiving a key carried by the driver, said key rotating the cam to operate one or the other of the said certain motor control switches when the key engages one or the other end of the cam slot respectively.

2. In a device of the character described, the combination with a screw shaft provided with a nut; an electric motor for driving said screw shaft; switches for controlling the motor and effecting its operation in one direction or the other; and an actuator for certain of the switches, operated by a member secured to and rotating with the screw shaft and comprising a driver and a driven cam, said driver having a key rotatable with the driver and movable radially relatively thereto as said driver is rotated, said driven cam having an elongated, arcuated slot into which said key extends, said key forming a lost motion connection between said driver and cam adapted to rotate the cam only after the driver has been rotated a predetermined number of revolutions in one direction or the other, whereby said cam engages and actuates one or the other of said certain switches to stop motor operation.

3. In a device of the character described, the combination with a screw shaft threadedly supporting a nut; an electric motor for driving said screw shaft in either direction; a plurality of switches for controlling motor operation, one of said switches being selectively operable into one position or the other to effect motor operation in one direction or the other respectively; means for operating certain other of said switches to stop motor operation when the nut reaches a predetermined position adjacent either end of the screw shaft, said means comprising a driver operatively connected with a member secured to and rotating with the screw shaft and a driven switch operating cam, said cam having an elongated, arcuated slot, a key extending into said slot and movable from end to end therein, the key being connected with the driver so as to be rotatable therewith but movable relatively thereto as the key moves from end to end in the arcuated slot of the cam, said key forming a lost motion connection between the driver and cam adapted to operate the cam only after the driver has been rotated a predetermined number of revolutions in one direction or the other to move the key into engagement with one or the other end of the arcuated slot, whereby said cam engages and actuates one or the other of said certain other switches to stop motor operation.

4. In a device of the character described, the combination with a screw shaft threadedly supporting a nut; an electric motor for driving said screw shaft in either direction; a plurality of switches for controlling motor operation, one of said switches being selectively operable into one position or the other to effect motor operation in one direction or the other respectively; means for operating certain other of said switches to stop motor operation when the nut reaches a predetermined position adjacent either end of the screw shaft, said means comprising a driver operatively connected with a member secured to and rotating with the screw shaft and a driven switch operating cam, the driver and cam having juxtaposed, parallel walls, the driver wall having a radial slot, the cam wall an elongated, arcuated slot; a key having its ends extending respectively into the slots of the driver and cam and forming a lost motion connection between the driver and cam adapted to operate the cam only after the driver has been rotated a predetermined number of revolutions in one direction or the other to cause the key to engage one or the other ends of the cam slot whereby the cam is actuated, to open one and close the other of said certain other of said switches, thereby operation of the motor in one direction is stopped and preparatory connections for motor operation in the opposite direction are established.

5. In a device of the character described, the combination with a screw shaft having a traveling nut thereon; a reversible electric motor for driving said screw shaft; a plurality of switches, certain of which control the direction of rotation of the motor and others limit the operation of the motor in either direction; an actuator for the limit switches, comprising a driver disc having a radial slot, a driven cam having a spiral slot, a key slidable in the radial slot of the driver and extending into the helical slot of the driven cam; and means on the screw shaft for rotating the driver to move the key through the helical slot in the cam from one end to the other whereby the cam is actuated in either direction to operate a limit switch after a predetermined number of revolutions of the screw shaft.

CHARLES D. DAVIDSON.

REFERENCES CITED

The following references are of record in the file of this patent:

UNITED STATES PATENTS

| Number | Name | Date |
|---|---|---|
| 828,547 | Hayden | Aug. 14, 1906 |
| 1,686,851 | Gorman | Oct. 9, 1928 |
| 1,773,243 | Stewart | Aug. 19, 1930 |
| 2,328,897 | Gill | Sept. 7, 1943 |
| 2,345,418 | Neuner | Mar. 28, 1944 |